Oct. 5, 1971  G. W. R. COOKE  3,609,783
VALVE FOR AN INFLATABLE LIFE-JACKET
Filed Nov. 10, 1969
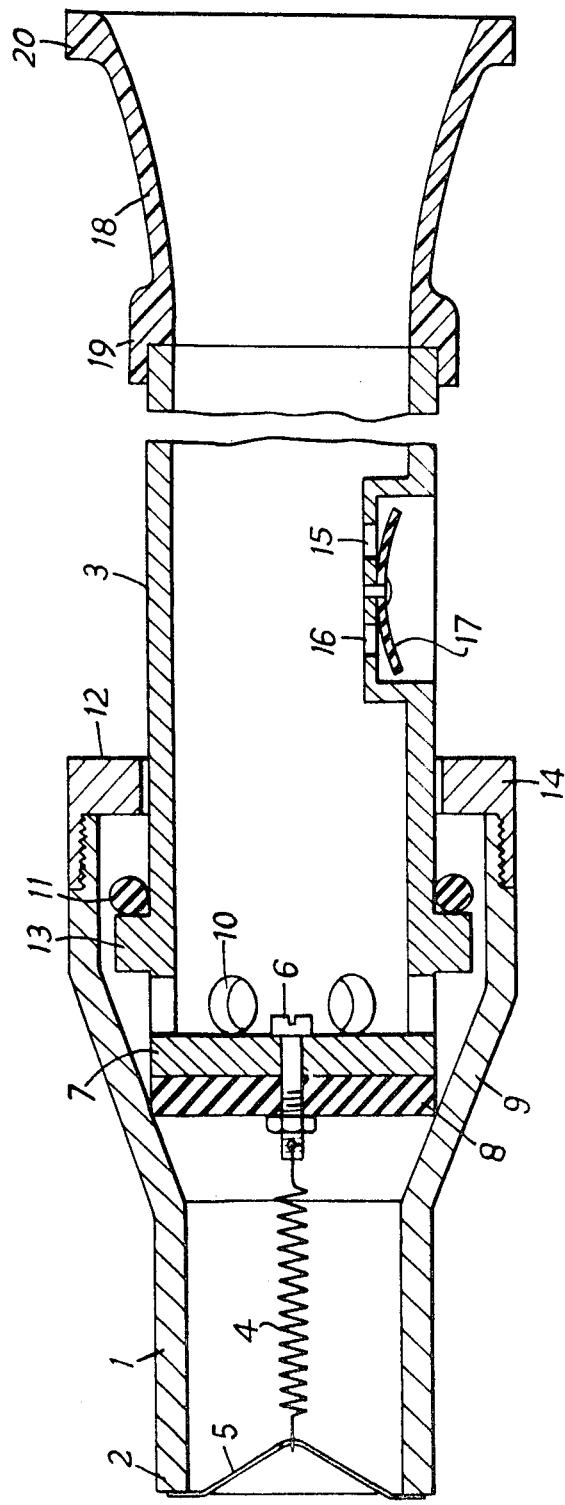
INVENTOR
GEORGE WILLIAM ROLAND COOKE
BY
Woodhams, Blanchard & Flynn
ATTORNEYS

United States Patent Office 3,609,783
Patented Oct. 5, 1971

3,609,783
VALVE FOR AN INFLATABLE LIFE-JACKET
George W. R. Cooke, 12 Salisbury Grove, Mytchett, Camberley, Surrey, England
Filed Nov. 10, 1969, Ser. No. 875,241
Claims priority, application Great Britain, Nov. 18, 1968, 54,692/68
Int. Cl. B63c 9/24
U.S. Cl. 9—311                                           6 Claims

ABSTRACT OF THE DISCLOSURE

A valve comprises an outer tube, an inner tube extending thereinto and having a first aperture in the region inside the outer tube, and a spring acting to urge the inner tube into the outer tube, the inner tube being axially movable against the action of the spring to a retracted position in which a first seal is formed preventing gas from escaping from the outer tube over the surface of the inner tube while allowing gas to pass from the outer tube to the inner tube through the first aperture and being axially returnable from the retracted position by the action of the spring to a forward position in which a second seal is formed preventing gas from escaping from the outer tube to the inner tube and the surroundings, the inner tube being provided with a second aperture in its side wall in the region extending beyond the outer tube, the second aperture having a non-return valve therein for allowing gas to escape from the inner tube to the surroundings.

The valve is suitable for use with a diver's life jacket and enables the diver to breath from the inflated jacket in an emergency.

---

The present invention relates to a valve, and, more particularly, to a valve especially, although not exclusively, suitable for a diver's inflatable life jacket. Such life-jackets are known and are worn flat around the neck by divers primarily for use in case of emergency at depth, the jacket being inflatable from an attached compressed air bottle to bring the diver quickly to the surface.

When inflated, the jacket, of flexible gas-tight material, for example, rubberised fabric, forms an irregular ring around the diver's neck, the periphery of the portion of the jacket at the front being more widely spaced from the hole in the middle than the periphery of the rear portion of the jacket behind the neck. The jacket is held in place by a strap passing between the diver's legs and attached at its ends to the peripheries of the front and rear portions respectively. The valve of the present invention is suitable for connection to such a life-jacket through a flexible pipe, through which the diver can breathe from the jacket in case of emergency.

The valve of the present invention comprises an outer tube, an inner tube extending thereinto and having a first aperture in the region inside the outer tube, and a spring acting to urge the inner tube into the outer tube, the inner tube being axially movable against the action of the spring to a retracted position in which a first seal is formed preventing gas from escaping from the outer tube over the surface of the inner tube while allowing gas to pass from the outer tube to the inner tube through the first aperture and being axially returnable from the retracted position by the action of the spring to a forward position in which a second seal is formed preventing gas from escaping from the outer tube to the inner tube and the surroundings, the inner tube being provided with a second aperture in its side wall in the region extending beyond the outer tube, the second aperture having a non-return valve therein for allowing gas to escape from the inner tube to the surroundings.

When in use with a life jacket, the free end of the outer tube of the valve can be connected to the life jacket through a flexible pipe.

Once the life-jacket has been inflated the diver can breathe through the mouth from the free end of the inner tube of the valve by drawing the inner tube to the retracted position whereby the second seal is broken allowing air to pass from the pipe and outer tube to the inner tube. To exhale, without removing the inner tube from the mouth, the diver allows the inner tube to return with the action of the spring and reform the second seal closing the outer tube. The exhaled air passes into the inner tube and out into the surroundings past the non-return valve in the second aperture.

If desired, the life-jacket can be inflated by blowing into the free end of the inner tube, with the inner tube in the retracted position and the thumb placed over the second aperture to prevent gas from escaping through the non-return valve.

The life-jacket can be deflated by retracting the inner tube to break the second seal.

Conveniently, the free end of the inner tube may be provided with a mouthpiece. The mouthpiece may be of a resiliently deformable material, for example rubber, and, in a preferred embodiment, is generally tubular in shape having a first end with an inside diameter approximately the same as the outside diameter of the free end of the inner tube of the valve to fit tightly over the free end. The mouthpiece tapers outwards from its first end to its other end which is elliptical in section, having a raised rim to be gripped behind the teeth.

Preferably the inner tube is axially movable from the forward position under the influence of excess pressure in the outer tube over that in the inner tube so that the valve also serves as an automatic vent valve during ascent from depth, allowing the release of gas from the inflated jacket to prevent the jacket from bursting as a result of the decrease in pressure of the surroundings. During ascent, when the pressure of the surroundings decreases sufficiently, the inner tube moves axially from the forward position, breaking the second seal and allowing release of gas through the valve to relieve the excess pressure in the jacket. Once at the surface, the inner tube is retained in the forward position by the action of the spring, preventing loss of gas from the jacket when buffeted by waves.

In an embodiment of the valve of the invention the outer tube tapers outwards at a region intermediate its ends and the end of the inner tube inside the outer tube is closed, the second seal being formed between the tapering wall of the outer tube and the periphery of the inner tube when in the forward position. The inner tube may be provided with a plurality of circumferentially spaced apertures through which gas can pass from the outer tube into the inner tube when the second seal is broken. The inner tube may be provided with a circumferential flange spaced from aperture or apertures in the inner tube in the direction towards its free end, the first seal being formed when the inner tube is in the retracted position between the flange on the inner tube and a circumferential flange extending inwardly from the inside wall of the outer tube at or near its end remote from its free end.

Advantageously, the pipe for connection to the valve of the invention is connected to an aperture in the front surface of the front portion of the jacket so that the pipe can be easily found in case of emergency. In this case a bleed tube is provided inside the jacket extending from the aperture to the top of the rear portion of the jacket behind the diver's neck to allow the jacket to be deflated at the surface for the purpose of diving.

A preferred embodiment of the present invention will now be described, by way of example, with reference to the accompanying drawing which shows a longitudinal section through the valve.

An outer tube 1 having a first end 2 for connection to the flexible pipe has an inner tube 3 axially movable therein. Each tube is conveniently of plastics material, for example nylon. A spring 4 is attached at one end of a cross-bar 5 seated at the first end 2 of outer tube 1 and at the other end to a bolt 6 passing through the closed end 7 of the inner tube 3. The spring 4 acts to draw the inner tube 3 into the outer tube 1 to a forward position as shown in the drawing in which the periphery of a disc of resiliently deformable material 8, for example rubber, attached to the closed end 7 of the inner tube by the bolt 6 seats against the inner wall of a portion 9 of the outer tube tapering outwardly from its first end 2, to form the second seal. When the second seal is broken by retracting the inner tube 3, the outer tube 1 is placed in communication with the inner tube 3 through a number of circumferentially spaced apertures 10 in the inner tube. When the inner tube is retracted an O-ring 11 of resiliently deformable material, for example rubber, fitting tightly around the inner tube 3 and spaced from apertures 10 in the direction away from its closed end 7 is brought into contact with an inwardly directed circumferential flange 12 on the outer tube 1 at the end remote from its free first end 2 to form the first seal preventing gas from escaping from the outer tube 1 over the outer surface of the inner tube 3, a circumferential flange 13 on the outer surface of the inner tube between the apertures 10 and the O-ring 11 pressing the O-ring into good sealing contact with the flange 12. For ease of assembly the flange 12 extends inwardly from an annular portion 14 threaded on its inner surface and screwed onto the threaded end of the outer tube 1 remote from its free first end.

An inset circular portion 15 of the side wall of the inner tube 3 in the region extending beyond the end of the outer tube 1 has a number of apertures 16 therein, with a piece of flexible material 17 fastened in the middle to the outside of the portion 15 covering the apertures 16 and closing them only when the pressure inside the inner tube is less than that of the surroundings to form a non-return valve. The inset circular portion 15 can be covered with the thumb for the purpose of inflating the jacket by mouth.

A rubber mouthpiece 18 has a first end 19 with an inside diameter approximately the same as the outside diameter of the inner tube 3 and fits snugly over the free end thereof. The mouthpiece tapers outwards from its first end 19 towards its other end, which has a raised rim 20 to be gripped behind the teeth.

I claim:

1. A valve comprising a tube having a first end for the entry of gas therein and a second end; a hollow member extending into said tube and passing through said second end, said hollow member having a first aperture in a region thereof inside said tube for the passage of gas from said tube to said hollow member and an open end outside said tube for outlet of gas therefrom; spring means urging said hollow member into said tube; first seal means operable by movement of said hollow member into said tube for sealing said tube to prevent escape of gas through said first aperture and through said second end of said tube; second seal means operable by retraction of said hollow member in said tube for sealing said tube to prevent escape of gas through said second end of said tube, whereby on retraction of said hollow member gas escapes from said tube only through said first aperture; said hollow member having a second aperture therein in a region thereof outside said tube; and non-return valve means in said second aperture for allowing gas to escape from said hollow member through said second aperture.

2. A valve according to claim 1 wherein said hollow member retracts under the influence of excess gas pressure in said tube over that in said hollow member.

3. A valve according to claim 1 wherein said tube includes at a region intermediate said first and second ends thereof a tapering portion which tapers inwardly towards said first end and said hollow member has a closed end remote from said open end, said closed end and said tapering portion constituting said first seal means.

4. A valve according to claim 1 wherein said hollow member includes a circumferential flange thereon spaced from said first aperture in the direction towards said open end and said tube includes a circumferential flange extending inwardly therefrom adjacent said second end thereof, said flanges constituting said second seal means.

5. A valve according to claim 1 wherein a mouthpiece is provided on said open end of said hollow member.

6. In combination: an inflatable life-jacket for a diver including a front portion having a front surface, said front surface having an aperture therein; a valve according to claim 1; and a pipe connecting said first end of said tube of said valve to said life-jacket aperture.

References Cited

UNITED STATES PATENTS

| 2,316,101 | 4/1943 | Norred | 9—313 |
| 3,064,287 | 11/1962 | Maholm | 9—319 |
| 3,396,743 | 8/1968 | Mackal et al. | 137—223 |
| 3,429,330 | 2/1969 | Bogossian et al. | 137—223 |

FOREIGN PATENTS

| 920,970 | 3/1963 | Great Britain | 137—223 |

MILTON BUCHLER, Primary Examiner

P. E. SAUBERER, Assistant Examiner

U.S. Cl. X.R.

128—147; 137—223; 251—354